(12) United States Patent
Adams

(10) Patent No.: US 8,079,068 B2
(45) Date of Patent: Dec. 13, 2011

(54) MANAGEMENT OF MULTIPLE CONNECTIONS TO A SECURITY TOKEN ACCESS DEVICE

(75) Inventor: Neil P. Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1139 days.

(21) Appl. No.: 11/458,029

(22) Filed: Jul. 17, 2006

(65) Prior Publication Data

US 2008/0016368 A1    Jan. 17, 2008

(51) Int. Cl.
G06F 7/04       (2006.01)
G06F 15/16      (2006.01)
G06F 17/30      (2006.01)
H04L 29/06      (2006.01)

(52) U.S. Cl. ........... 726/9; 726/2; 726/3; 726/6; 726/14; 726/18; 726/20; 380/270; 713/182; 713/183; 713/185

(58) Field of Classification Search ............... 726/9
See application file for complete search history.

(56) References Cited

U.S. PATENT DOCUMENTS

| | | | |
|---|---|---|---|
| 5,015,830 A | 5/1991 | Masuzawa et al. | |
| 5,640,307 A | 6/1997 | Bleier et al. | |
| D396,452 S | 7/1998 | Naruki | |
| 5,796,085 A | 8/1998 | Bleier | |
| D405,070 S | 2/1999 | Kitagawa et al. | |
| D423,470 S | 4/2000 | Neifer et al. | |
| 6,084,968 A * | 7/2000 | Kennedy et al. | 380/259 |
| D475,708 S | 6/2003 | Bergstrom | |
| 6,772,331 B1 * | 8/2004 | Hind et al. | 713/151 |
| D501,208 S | 1/2005 | Ozolins et al. | |

(Continued)

FOREIGN PATENT DOCUMENTS

EP    0703676 A    3/1996

(Continued)

OTHER PUBLICATIONS

Maier, R.: "Authentication and paring in limited mobile environments" INET, [Online] Mar. 17, 2004 (Apr. 17, 2004), XP002396358 INET. Retrieved from the Internet: URL:http//www.esat.kuleuven.ac.be/cosic/seminars/slides/seminar-2004-03-17.pdf> [retrieved on Aug. 24, 2006].

(Continued)

*Primary Examiner* — Taghi Arani
*Assistant Examiner* — Narciso Victoria
(74) *Attorney, Agent, or Firm* — Jenna L. Wilson; Dimock Stratton LLP

(57) ABSTRACT

A system and method for automatically managing a connection between a user device and a security token access device. The access device is adapted to wirelessly communicate with a plurality of user devices and to be securely paired with at least one of the plurality of user devices, and is further adapted to maintain connection information relating to each of the plurality of user devices. The connection information comprises security information for each user device securely paired with the access device. The access device automatically manages a connection by maintaining a store of connection information comprising security information for each of a set of at least one securely paired user devices; determining whether one of the securely paired user devices is a stale device; and if it is determined that one of the securely paired user devices is a stale device, implementing a management protocol for handling the stale device.

18 Claims, 4 Drawing Sheets

U.S. PATENT DOCUMENTS

| | | | |
|---|---|---|---|
| 7,565,529 B2 * | 7/2009 | Beck et al. | 713/156 |
| 2002/0154607 A1 * | 10/2002 | Forstadius et al. | 370/311 |
| 2003/0105954 A1 | 6/2003 | Immonen et al. | |
| 2003/0183691 A1 | 10/2003 | Lahteenmaki et al. | |
| 2004/0188519 A1 | 9/2004 | Cassone | |
| 2004/0199474 A1 | 10/2004 | Ritter | |
| 2006/0072527 A1 | 4/2006 | Beck et al. | |

FOREIGN PATENT DOCUMENTS

| | | |
|---|---|---|
| EP | 1049306 A | 11/2000 |
| EP | 1253559 A | 10/2002 |
| EP | 1349031 | 10/2003 |
| EP | 1471453 | 10/2004 |
| EP | 1605627 A | 12/2005 |
| EP | 1635508 A | 3/2006 |
| EP | 1710758 A1 | 10/2006 |
| EP | 1713201 A1 | 10/2006 |
| EP | 1713205 A1 | 10/2006 |
| GB | 2341061 A | 3/2000 |
| WO | 0072506 A1 | 11/2000 |
| WO | 02/01520 | 1/2002 |
| WO | 0221867 A2 | 3/2002 |
| WO | 0245317 A2 | 6/2002 |
| WO | 02063576 A1 | 8/2002 |
| WO | 03012671 A1 | 2/2003 |
| WO | 2004027588 A2 | 4/2004 |
| WO | 2006051494 A1 | 5/2006 |

OTHER PUBLICATIONS

European Search Report dated May 31, 2007 received in EP Application No. 06117313.4.

Franks, J. et al, "An Extension to HTTP: Digest Access Authentication", IETF Standard, Internet Engineering Task Force, IETF CH, Jan. 1997, XP015007853. ISSN: 0000-0003.

* cited by examiner

FIG. 3A

| DEVICE ADDRESS | BT PAIRING KEY | SECURE PAIRING KEY | LAST CONNECTION | STALE_FLAG |
|---|---|---|---|---|
| A6:00:01:00:7F:AB | EFDD389AFB5B064B | FE8BB3579D41... | 20060516230101 | 0 |
| A6:00:01:05:10:CA | 2DE957D5AA1C6C26 | BD063A9CBB23... | 20060515101000 | 0 |
| A6:00:01:3D:DB:00 | 556A977BAD0389DE | 72EEF43295A2... | 20060324133000 | 1 |
| 00:00:00:00:00:00 | 00000000000000000 | 00000000000000... | 00000000000000 | 0 |

FIG. 3B

| DEVICE ADDRESS | BT PAIRING KEY | SECURE PAIRING KEY | LAST CONNECTION | ACTIVE_FLAG |
|---|---|---|---|---|
| A6:00:01:00:7F:AB | EFDD389AFB5B064B | FE8BB3579D41... | 20060516230101 | 1 |
| A6:00:01:05:10:CA | 2DE957D5AA1C6C26 | BD063A9CBB23... | 20060515101000 | 1 |
| A6:00:01:3D:DB:00 | 556A977BAD0389DE | 72EEF43295A2... | 20060324133000 | 0 |
| 00:00:00:00:00:00 | 00000000000000000 | 00000000000000... | 00000000000000 | 1 |

FIG. 3C

| DEVICE ADDRESS | BT PAIRING KEY | SECURE PAIRING KEY | LAST CONNECTION |
|---|---|---|---|
| A6:00:01:00:7F:AB | EFDD389AFB5B064B | FE8BB3579D41... | 20060516230101 |
| A6:00:01:05:10:CA | 2DE957D5AA1C6C26 | BD063A9CBB23... | 20060515101000 |
| A6:00:01:3D:DB:00 | 00000000000000000 | 00000000000000... | 20060324133000 |
| 00:00:00:00:00:00 | 00000000000000000 | 00000000000000... | 00000000000000 |

US 8,079,068 B2

MANAGEMENT OF MULTIPLE CONNECTIONS TO A SECURITY TOKEN ACCESS DEVICE

BACKGROUND

1. Technical Field

The present invention relates generally to security token access devices, and in particular to the management of connections to a security token access device that is capable of maintaining connections with multiple user devices.

2. Description of the Related Art

Security tokens are physical devices for use in authenticating a user of a computer or communication system or device to that system or device. Security tokens may comprise memory for storing financial or personal data, or private data such as private keys used in the S/MIME (Secured Multipurpose Internet Mail Extensions) encryption technique. Preferably, some of this data may be secured using a PIN (personal identification number) or a password as an access control measure, such that the user must be validated to the security token by providing the correct PIN or password before accessing the protected data stored in the token's memory. A common type of security token is a smart card, also referred to as a chip card or integrated circuit card, which is typically used in association with a smart card access devices with an embedded integrated circuit (such as a microprocessor and/or memory) for use as storage of sensitive data or user authentication. Applications of security tokens are known in the art.

Some security tokens are used in conjunction with a security token access device that establishes a communication link between the security token and the user device. The access device may store and maintain information relating to a valid communication link, such as the address of the user device, pairing information and cryptographic keys, and the like. Security information, which may include pairing information, may be required in order to have a secure connection between the access device and the user device. If the security information is not present, then a secure pairing must first be established before the user device can receive or transmit data from or to the security token.

However, access devices typically rely on a dedicated connection with the connecting device, such as a Universal Serial Bus (USB) connection between the user device and the access device, or a wireless communication link between the access device and a single connecting device. Therefore, the security token access device is effectively dedicated for use with a single user device, and cannot be used in conjunction with a further user device without first severing the connection between the first device and the access device. This is inconvenient for a user who uses multiple user devices, for example a personal computer and a mobile communication device, and requires the use of the security token and access device with the multiple user devices in order to perform secure operations with the user devices, such as digitally signing electronic messages sent from the user devices.

It is therefore desirable to provide a system and method by which a security token access device may be used with multiple user devices over a wireless connection. It is further desirable to provide a system and method for managing multiple connections from user devices to an access device to identify and remove connections to user devices that are no longer in use by an unauthorized user.

BRIEF DESCRIPTION OF THE DRAWINGS

In drawings which illustrate by way of example only a preferred embodiment,

FIGS. 3A, 3B, and 3C are tables representing connection information stored by the access device of FIG. 1.

DETAILED DESCRIPTION

Figure 1:
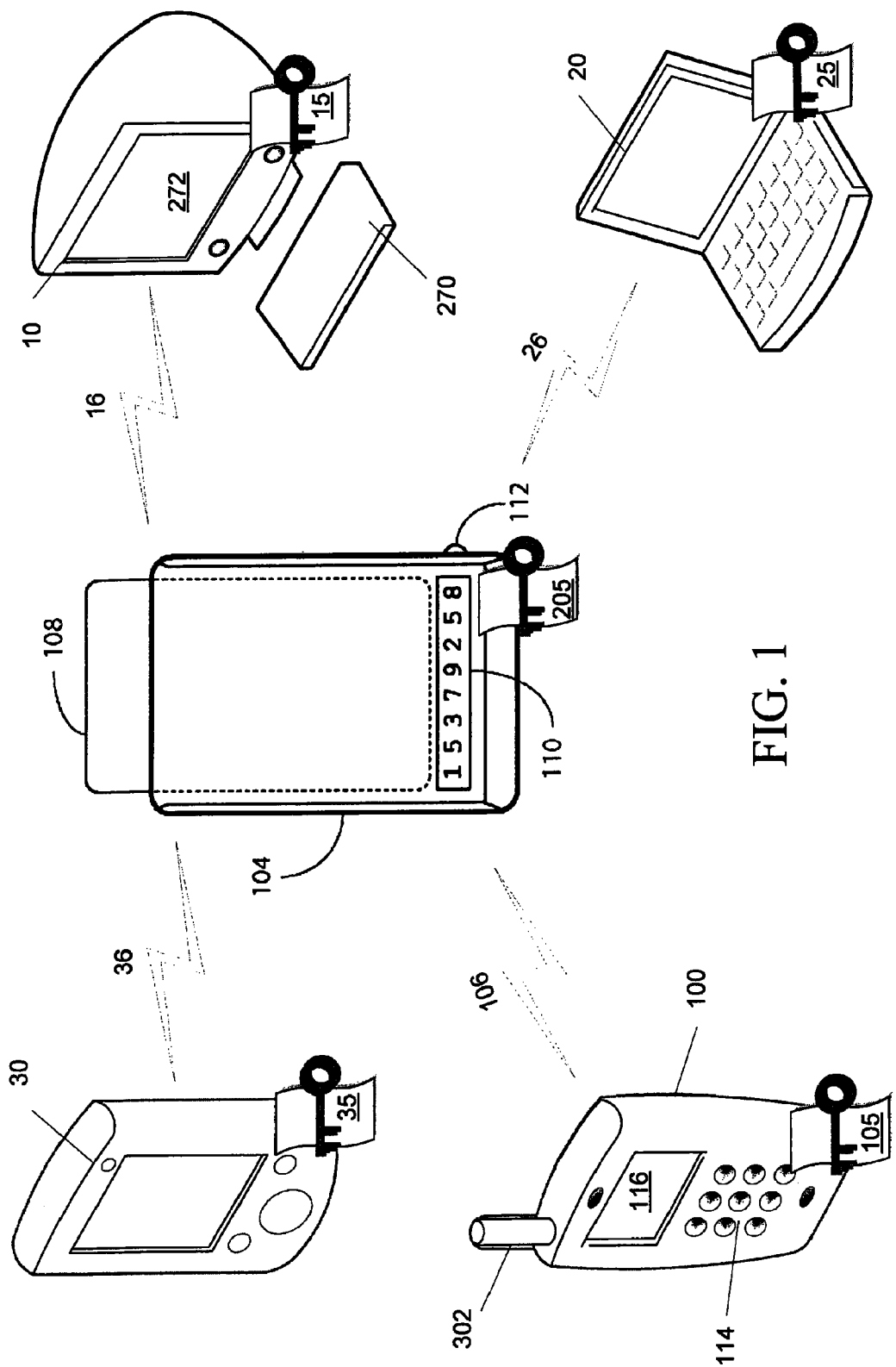
FIG. 1 is a schematic diagram of a system comprising a plurality of user devices, a security token, and a security token access device.

Referring to FIG. 1, an overview of an exemplary system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the simple overview of FIG. 1.

FIG. 1 shows a first user device, shown here as a personal computer 10; a second user device, shown here as a second personal computer 20; a third user device shown here as a personal digital assistant 30; and a fourth user device, here a mobile communication device 100. It will be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "communication device", "computing device", or "user device" may be used interchangeably.

Each of these user devices may, for example, be connected to an Internet Service Provider on which a user of the system of FIG. 1, likely the user associated with each of the user devices illustrated in FIG. 1, has an account. The system of FIG. 1 may be located within a company, possibly connected to a local area network, and connected to the Internet or to another wide area network, or connected to the Internet or other network through a large application service provider. Other features for network connectivity, such as the infrastructure of the local area network, Internet, wide area network, wireless gateway, and the like, are not shown in FIG. 1 but are known to those having ordinary skill in the art. Of the user devices, preferably at least the mobile communication device 100 is capable of sending and receiving messages and other data via wireless transmission, typically at a radio frequency (RF), from a base station in a wireless network to the user device. The particular network may be any wireless network over which messages may be exchanged with a user device such as the mobile communication device 100. The user devices may receive data by other means, for example through a direct connection to a port provided on the user device such as a Universal Serial Bus (USB) link.

Each of the user devices 10, 20, 30, 100 is capable of communicating with a security token access device 104 over a wired or wireless communication link, but in the preferred embodiment described below, the communication between the access device 104 and the user devices 10, 20, 30, 100 takes place over a wireless communication link. A non-exhaustive list of examples of wireless local area network standards for wireless communication link 106 includes the Institute of Electrical and Electronic Engineers (IEEE) for Wireless LAN MAC and Physical layer (PHY) 802.11 a, b, g and n specifications or future related standards, the Bluetooth® standard, the Zigbee™ standard and the like. The security token access device 104 may comprise a reader device or a read-write device. Thus, for example, if the security token access device 104 is a read-write device, the access device 104 may be configured to not only read data from an associated security token, but to also write data to the security token. It will be appreciated by those skilled in the art that the systems and methods disclosed herein may incorporate a security token access device that is capable of both reading and writing to a security token, and that the embodiments described herein are not limited to a security token reader device.

A security token, here shown as a smart card 108, is shown inserted into the access device 104. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. The smart card's functionality may be embedded in a device having a different form factor and being capable of communicating over an additional communication protocol, for example a USB device.

The security token 108 may include a connector for powering the semiconductor device and performing serial communication with an external device. The access device 104 may be provided in one of a number of form factors, including, but not limited to, a portable access device that can be worn on the person, for example by means of a lanyard (not shown) suspended around a user's neck. Alternatively, the access device 104 may be provided in a desktop reader or reader-writer form factor, or other form factor suitable for the security token environment that will be apparent to the skilled reader.

The user whose security information is stored on the security token 108 may use the access device 104 for identification and to digitally sign and/or decrypt messages sent by the user device 10, 20, 30, 100. For example, one or more of the user devices 10, 20, 30, 100 may be able to send and receive e-mail messages via an e-mail server (not shown). The user devices 10, 20, 30, or 100 may be configured to employ the Secure Multipurpose Internet Mail Extensions (S/MIME) protocol, such that e-mail messages received at the user devices 10, 20, 30, or 100 are encrypted using a symmetric algorithm with a random session key generated by the sender of the e-mail message and encrypted by the recipient's (most likely the user's) public key and sent with the message, and messages sent from the user devices 10, 20, 30, or 100 are likewise encrypted with a random session key generated at the user devices 10, 20, 30, or 100. Upon receipt of an encrypted e-mail message, a user device 10, 20, 30, or 100 may extract the encrypted session key and send it to access device 104 via the preferably secure communication link 16, 26, 36, or 106. The access device 104 then sends the encrypted session key to the security token 108, and the decryption engine of the security token 108 may decrypt the encrypted session key using the recipient's private decryption key, which is stored in the security token 108. The access device 104 retrieves the decrypted session key from the security token 108 and forwards it to the user device 10, 20, 30, or 100 via communication link 16, 26, 36, or 106 so that the user device can decrypt the received e-mail message. The security token 108 may prevent unauthorized use of the recipient's private decryption key by requiring that a password or personal identification number (PIN) be supplied at the user device 10, 20, 30, or 100 (and verified against a password or PIN stored at the security token 108 either in the clear or in an encoded form) before allowing the decryption operation to proceed.

Similarly, to add a digital signature to an e-mail message being sent by a user device 10, 20, 30, or 100, the user device may send a hash of the contents of the e-mail message to the access device 104 over the communication link 16, 26, 36, or 106. The access device 104 passes the hash to the security token 108, which produces a digital signature from the hash and the sender's private signing key, which is stored in the security token 108. The security token 108 then passes the digital signature to the access device 104, which forwards it to the user device 10, 20, 30, or 100 via the communication link 16, 26, 36, or 106 so that the user device can transmit it along with the e-mail message to the e-mail server. Again, the security token 108 may prevent unauthorized use of the recipient's private signing key by requiring that a password or PIN be supplied before allowing the signing operation to proceed.

As those skilled in the art will appreciate, one or more of the user devices 10, 20, 30, 100 may be configured to provide other functions besides encryption that may require authentication by the security token 108 via the access device 104.

Figure 2:
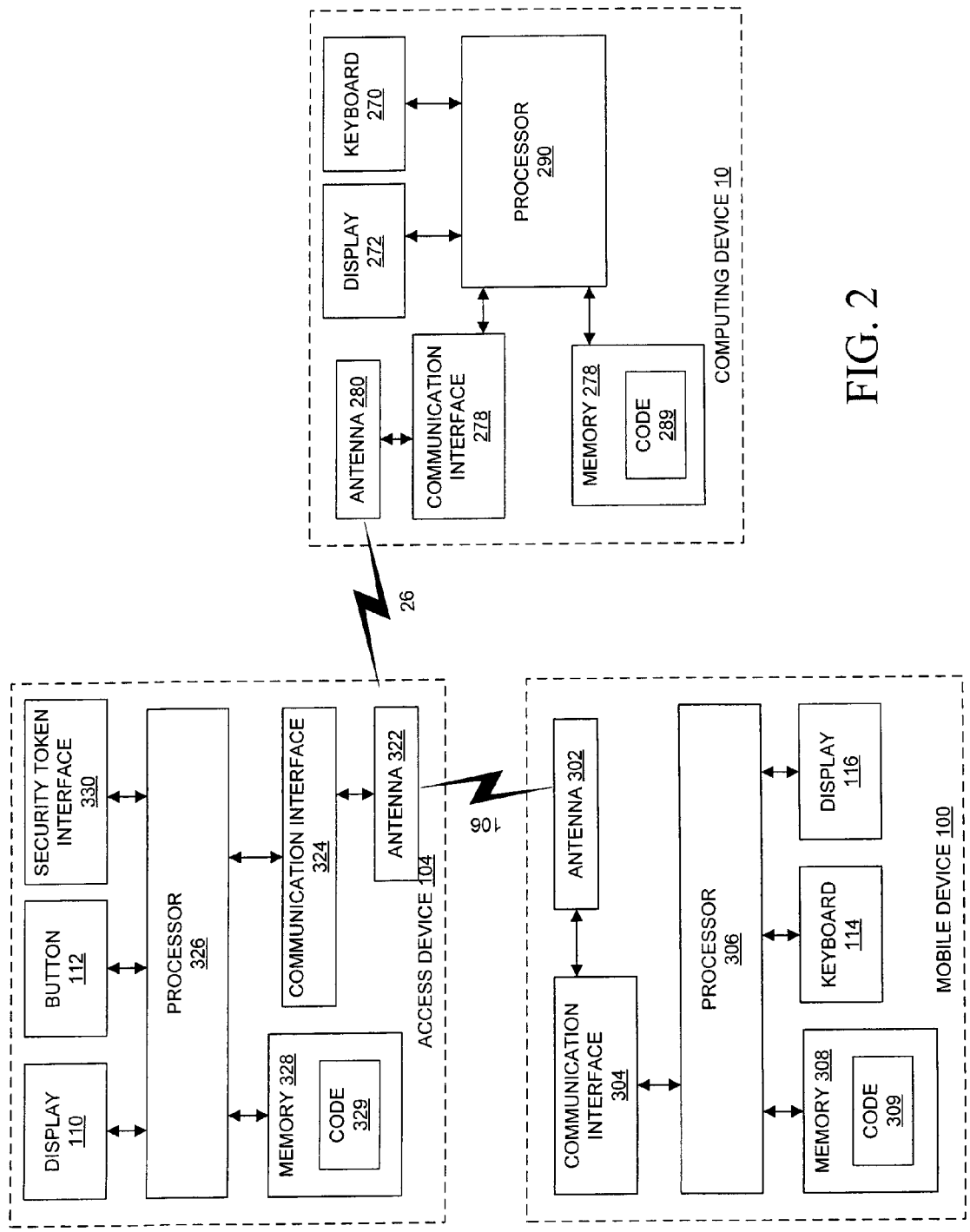
FIG. 2 is a block diagram of an access device, mobile communication device, and a computing device of FIG. 1.

A block diagram of the access device 104, a mobile device 100, and a computing device such as the personal computer 10 is provided in FIG. 2. In the preferred embodiment, the access device 104, the mobile device 100, and the personal computer 10 each comprises a two-way RF communication device having data communication capabilities and optionally voice communication capabilities. Preferably each of the mobile device 100 and the personal computer 10 has the capability to communicate with other computer systems via a local or wide area network.

The access device 104 preferably comprises a processor 326, configured to execute code 329 stored in a memory element 328. The processor 326 and memory element 328 may be provided on a single application-specific integrated circuit, or the processor 326 and the memory element 328 may be provided in separate integrated circuits or other circuits configured to provide functionality for executing program instructions and storing program instructions and other data, respectively. The processor is connected to a security token interface 330. The memory 328 may comprise both volatile and non-volatile memory such as random access memory (RAM) and read-only memory (ROM); preferably sensitive information, such as keys and personal identification numbers (PINs), are stored in volatile memory.

The code 329 provided in the access device 104 may include operating system software, password verification code, and specific applications, which may be stored in non-volatile memory. For example the code 329 may comprise drivers for the access device 104 and code for managing the drivers and a protocol stack for communicating with the communications interface 324 which comprises a receiver and a transmitter (not shown) and is connected to an antenna 322.

The access device 104 may also be configured to interface with the user via the input means 112, here provided as a button for manipulation by the user, and via the display 110, here a single-line readout for displaying strings of alphanumeric characters as shown in FIG. 1. The communications interface 324 may also comprise other processing means, such as a digital signal processor and local oscillators. The access device 104 may include a power supply (not shown), which in the case of a portable security token access device is provided by at least one battery or power cell. Preferably the casing and the power supply of the access device 104 is configured such that removal of the casing disconnects the power supply, thereby clearing the volatile memory of the access device 104. The access device 104 may also be provided with a further output means, not shown, such as a light emitting diode (LED), which may be tri-coloured for indicating the status of the access device 104.

The mobile device 100 comprises an input means, shown in FIG. 1 as a reduced keyboard 114, although alternative or additional input means, such as thumbwheels and buttons, may also be provided. The mobile device 100 also comprises an output means, such as a display 116; the mobile device 100 may also be provided with a speaker, not shown. The mobile device comprises an antenna 302 connected to a communication interface 304, which in turn communicates with a processor 306. The communication interface 304 may include similar components as the communication interface 324 of the access device 104, such as a digital signal processor, local oscillator, a receiver, and a transmitter. The processor 306 accesses a memory element 308 which stores code 309, which may include operating system software and application-specific software, as well as drivers and protocol stacks for handling communication over one or more communication links, such as the wireless communication link 106. The memory element 308 may include both volatile and non-volatile memory. The memory element 308 and the processor 306 may be provided in a single application-specific integrated circuit, or may be provided as separate components. The processor 306 may execute a number of applications that control basic operations, such as data and voice communications via the communication interface 304, as well as a personal information manager that may be installed during manufacture and e-mail client for composing, editing, digitally signing and encrypting and digitally verifying and decrypting messages.

Similarly, a personal computer 10 is provided with an input device such as a keyboard 270, and is provided with an output means such as a monitor 272. If the personal computer 10 is capable of wireless communication with the access device 104, then it will also comprise an antenna 280 in communication with a communications interface 278 as shown in FIG. 2, which like the communications interfaces of the mobile device 100 and the access device 104, may comprise a receiver, transmitter, digital signal processor, and local oscillators. The personal computer 10 may comprise multiple data storage means, denoted in FIG. 2 by the memory element 284. The memory 284 may include RAM, ROM, and other storage media including a hard drive and removable digital storage media; the memory 284 stores code 289 that is executed by the processor 290. The code 289 may include operating system software, drivers for the communications interface 278, a protocol stack for communicating via the communications interface 278, a personal information manager and an e-mail client for composing, editing, digitally signing and encrypting and digitally verifying and decrypting messages. The personal information manager, e-mail client, and other data stores on the personal computer 10 are preferably capable of being reconciled with similar data stores on the mobile device 100.

The specific design and implementation of the communications interfaces of the access device 104, the mobile device 100, and the computing device 10, as well as the other user devices 20, 30, are dependent upon the communication network in which the devices are intended to operate. In a preferred embodiment, the user devices 10, 20, 30, 100 each communicate with the access device 104 via wireless communication links 16, 26, 30 and 106 respectively as illustrated in FIG. 1, for example in accordance with the Bluetooth® standard.

Preferably, in order to ensure the security of the wireless communication links 16, 26, 30 and 106, a system of pairing mechanisms is employed. For example, when the user device 10, 20, 30, or 100 determines that security token functionality is needed, the user device may attempt to detect the availability of a nearby security token access device 104. If this is the first time that the user device 10, 20, 30, or 100 has attempted to connect to the access device 104 or no previous wireless connection pairing between the user device 10, 20, 30, or 100 and the access device 104 currently exists, a wireless connection pairing step is carried out.

In the preferred embodiment, the access device 104 displays an identifier or access device ID, which is a preferably unique value associated with the access device 104, in the display 110. This access device ID may comprise the Media Access Control (MAC) address of the access device 104. The access device ID may be displayed in response to a user action, for example by pressing the button 112 on the access device 104. The user is prompted at by the user device attempting to pair with the access device 104 to enter the access device ID via the input means associated with the user device for storage in memory 308 or 284. This step thus identifies to the connecting user device 10, 20, 30, or 100 which access device 104 is to be used for security functions by the user device 10, 20, 30, or 100.

Once the access device ID is input on the user device 10, 20, 30, or 100, the connecting user device 10, 20, 30, or 100 may request from the access device 104 a list of supported encryption protocols and algorithms; the access device 104 may then create a list of supported protocols and algorithms and transmit it to the connecting user device. The connecting user device 10, 20, 30 or 100 then selects an encryption algorithm supported by the connecting user device, and transmits instructions to the access device 104 to use the selected algorithm for future processes, such as the wireless and secure pairings described below, as well as future encryption of messages between the devices.

Next, a security value is exchanged between the access device 104 and the connecting user device 10, 20, 30, or 100. The access device 104 is configured to display this security value, for example a PIN; the PIN is read by the user and entered on the connecting user device 10, 20, 30, or 100. The access device 104 may be configured to display the PIN once the button 112 is actuated, so for example, the connecting user device 10, 20, 30, or 100 may be configured to prompt the user to press the button 112 on the access device 104 as well as to enter the new value displayed by the access device 104. This completes the wireless connection pairing; the connecting user device 10, 20, 30, or 100 thus stores the access device ID and the PIN provided by the access device 104, for example in volatile memory. In a preferred embodiment, the access device 104 and the connecting user device 10, 20, 30, or 100 generate a wireless link key from the PIN thus exchanged between the access device 104 and the user device 10, 20, 30 or 100, and this wireless link key is stored by the access device 104 and the user device 10, 20, 30 or 100. The PIN is therefore not stored in memory on either device.

Further user devices 10, 20, 30, or 100 may be wireless connection paired at this stage in a similar manner. The access device ID displayed by the access device 104 will be the same as the value previously displayed; the PIN, however, may be a different value than the PIN used during the pairing of a previous device 10, 20, 30, or 100. The PIN may be a random value generated by the code 329 resident on the access device 104, seeded by one or more sources of entropy using techniques known in the art. Once the connecting user device 10, 20, 30, or 100 has stored the PIN or, more preferably, has generated and stored the wireless link key, it transmits a confirmation to the access device 104 and the access device 104 erases the PIN from the display 110. The wireless link key or PIN may be used in encrypting communications between the corresponding user device 10, 20, 30, and 100 and the access device 104.

Once the wireless connection pairing (or pairings) is (or are) established between one or more connecting user devices 10, 20, 30, or 100 and the access device 104, the user devices and the access device are preferably paired with a further secure pairing. For each connecting user device 10, 20, 30, or 100, the access device 104 is configured to display a secure pairing value, such as a secure pairing PIN, on its display 110, which is read by the user and entered on the connecting user device 10, 20, 30, or 100. The secure pairing value preferably comprises a random value, for example an eight-digit value, generated by the code 329 resident in the access device 104. The access device 104 may be configured to display this secure pairing value once the button 112 on the access device 104 is actuated, and again, the connecting user device 10, 20, 30, or 100 may be configured to prompt the user to enter the secure pairing value, and if necessary to press the button 112 in order to display the secure pairing value. After the secure pairing is complete, the connecting user device 10, 20, 30, or 100 may transmit confirmation that the value was received to the access device 104 before the access device 104 erases the secure pairing value from the display 110. The secure pairing value may be used by the connecting user device 10, 20, 30, or 100 and the access device 104 to generate a further connection key (a "secure pairing key"), preferably an Advanced Encryption Standard (AES) 256-bit key, for use in communications between the connecting user device 10, 20, 30, or 100 and the access device 104. This secure pairing key may be an encryption key or a master connection key for use in encrypting subsequent communications between the access device 104 and the user device 10, 20, 30, or 100; if the secure pairing key is a master connection key, it may be used to generate further encryption keys for use by the access device 104 and the user device 10, 20, 30 or 100. If the secure pairing value is used to generate a secure pairing key, then preferably the secure pairing value is erased from the memory of the access device 104 and the user device 10, 20, 30 and 100 after the secure pairing key is generated.

The communications link 16, 26, 36, or 106 is thus secured by a secure pairing key generated using the secure pairing value, and each device in the system thus securely paired with the access device 104 stores a secure pairing key, as indicated by the key material 15, 25, 35, and 105 shown in FIG. 1. The access device 104 further stores connection information or key material 205, which may comprise the address of each device 10, 20, 30 or 100 that maybe connected to the access device 104, and may also comprise the secure pairing key shared with the connecting device, and preferably the timestamp of the secure pairing. A simple table schematic of the store of connection information 205 stored in the memory 328 of the access device 104 is shown in FIGS. 3A, 3B, and 3C; in the embodiment shown here, user devices 100, 10, and 20 completed both the wireless pairing and secure pairing steps, and the connection information 205 stored by the reader device 104 therefore comprises a wireless link key (as shown in the accompanying drawings, the wireless link key is referred to as a "BT pairing key", thus reflecting an embodiment in which the Bluetooth protocol is employed) and security information comprising a secure pairing key. It can be seen that the remaining user device 30 has not been paired with the reader device 104 at all in this example. It will be understood by those skilled in the art that the connection information 205 need not be stored in the memory 328 of the access device in the contiguous manner suggested by the accompanying drawings; for example, the access device 104 may be configured to store each value in the table of FIG. 3 at non-sequential memory addresses, or to store portions of each value at non-sequential memory addresses. Some values, such as the address of each device and the Bluetooth link key, may be stored in non-volatile memory, whereas the secure pairing keys are preferably stored in volatile memory such that if the power supply is disconnected from the memory 328 and/or processor 326, for example during a reset procedure, the secure pairing keys are erased from the memory 328.

Preferably, the system 100 is configured such that upon pairing of subsequent devices 10, 20, 30, or 100, the access device 104 transmits the device's identifier and/or its MAC address, and the time at which the pairing was made to all previously paired devices 10, 20, 30, or 100.

Also preferably, the secure pairing is initiated and completed before one of the following activities is attempted: importation of certificates stored on the smart card or other security token 108 into the connecting user device 10, 20, 30, or 100; private key operations for signing a message to be sent from the connecting user device 10, 20, 30, or 100 or decrypting a message received by the connecting user device 10, 20, 30, or 100; launch of a configuration utility on the connecting user device 10, 20, 30, or 100 for configuring access device-specific settings; a user-initiated device password change on the connecting user device 10, 20, 30, or 100; any other attempt by the connecting device user device 10, 20, 30, or 100 to connect to the access device 104. Other events and activities may trigger a secure pairing. If the connecting user device 10, 20, 30, or 100 and the access device 104 have already entered into a secure pairing, then it is not necessary to re-initiate the secure pairing steps. In a further embodiment, the wireless and/or secure pairing steps may be undertaken automatically without requiring the user to actuate any input on the access device 104, or to manually enter any values displayed by the access device 104 into the connecting user device 10, 20, 30, or 100.

Once the secure pairing is completed, the connecting device 10, 20, 30, or 100 and the access device 104 may negotiate any further communications protocols for the wireless communication link 16, 26, 36, or 106. As described above, the access device 104 and the connecting user device 10, 20, 30 or 100 may have established a master connection key for deriving further connection keys for use in transmitting data, using key establishment protocols known in the art. Thus, the master connection key data may comprise the secure pairing key described above, or it may comprise the secure pairing key along with a further seed value, generated by either the connecting user device 10, 20, 30, or 100 or the access device 104, and transmitted to the access device or the connecting user device. In one embodiment, the connecting user device 10, 20, 30, or 100 may include the seed value, preferably a randomly-generated value at least 64 bytes long, with the instructions sent to the access device 104 along with the selected encryption algorithm. The master connection key may be used by both the access device 104 and the connecting user device 10, 20, 30, or 100 to derive a plurality of keys for use in the transport layer, for example keys for encrypting, decrypting, and authenticating messages transmitted between the access device 104 and the connecting device 10, 20, 30, or 100. A new master connection key is preferably generated for each user device 10, 20, 30, or 100 that pairs with the access device 104; thus, each device 10, 20, 30, or 100 that is securely paired with the access device 104 will store a single master connection key, while the access device 104 will store one master connection key for each device that is validly paired with the access device 104. This master connection key, associated with one of the user devices 10, 20, 30, or 100, may comprise part of the security information and may be stored in association with store of connection information 205 described with reference to FIGS. 3A, 3B, and 3C, or may be stored in a separate location in the memory 328. A second device 10, 20, 30, or 100 that is paired with the access device 104 is therefore unable to decrypt messages passed between the access device 104 and a first device 10, 20, 30, or 100, even though both devices may be paired with the access device 104 at the same time. In the examples of FIGS. 3A, 3B, and 3C, the store 205 comprises a secure pairing key; it will be appreciated by those skilled in the art that the store 205 may comprise the secure pairing key or the master connection key associated with the user device 10, 20, 30, or 100, If the master connection key is derived from the secure pairing key, and the secure pairing key itself is not used any further by the access device 104, then the master connection key and not the secure pairing key need be stored. In a further embodiment, both the master connection key and the secure pairing key may be stored as part of the security information stored in the store of connection information 205.

Figure 4:
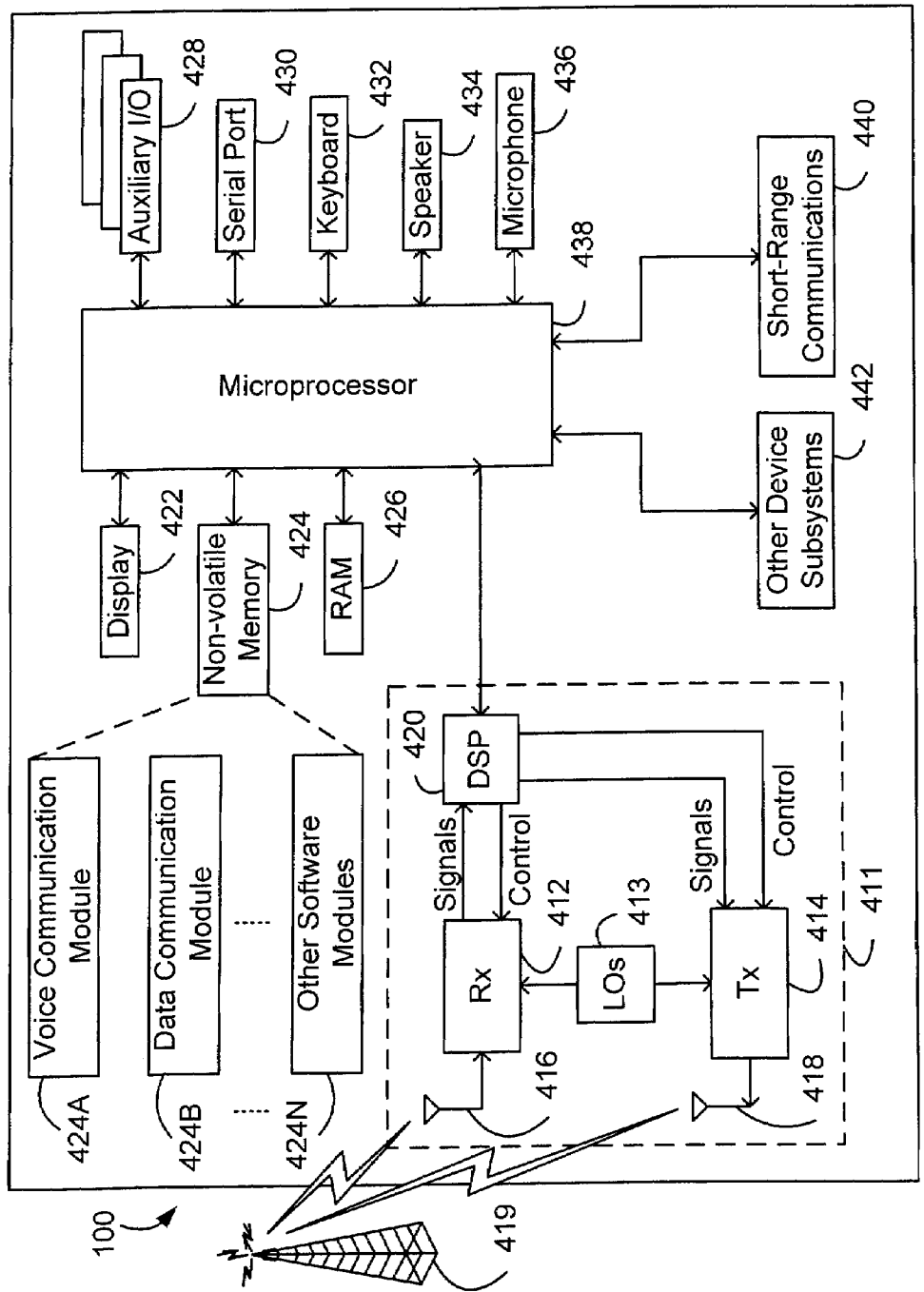
FIG. 4 is a block diagram of a mobile communication device for use in the embodiment of FIG. 1.

In addition to the encryption of messages between the access device 104 and the user device 10, 20, 30, or 100, a further access control method is preferably implemented. Once a first device, for example the mobile communication device 100, completes the secure pairing step, the mobile device 100 then sets a connection password. The connection password may be set by the user in response to a prompt on the mobile communication device 100, and is transmitted to the access device 104 and stored in memory 328. Preferably, the connection password is hashed or otherwise encrypted before it is transmitted to the access device 104, and the access device 104 thus stores the connection password only in hashed or encrypted form. The connection password controls access to the access device 104 by requiring the password for all future connections. The same connection password may be used for all user devices 10, 20, 30, or 100 that are paired with the access device 104. Thus, once a secure pairing is accomplished, as shown in FIG. 4 if the access device 104 determines that the connecting user device 10, 20, 30, or 100 is not the first user device 10, 20, 30, or 100 to be paired with the access device and a connection password already exists, the connection password is transmitted to the connecting user device 10, 20, 30, or 100 for storage, and the connecting user device 10, 20, 30, or 100 is configured to use this password to access the access device 104. The user therefore is not required to memorize an additional password for each device paired with the access device 104. The connection password may also comprise part of the security information, and may be stored in association with the security information stored with the store of connection information 205.

If the secure pairing with a user device is to be terminated or dropped by the access device 104, the access device 104 erases or overwrites any valid (likely non-zero) secure pairing key and/or master connection key data associated with that user device stored in the store of connection information 205 relating to the secure pairing. Thus, upon receipt of an instruction to terminate a secure pairing with a user device, the access device 104 removes at least the valid secure pairing key and/or master connection key associated with the selected device by overwriting at least a portion of the key, or most preferably the entire key, for example with a series of zeroes. As will be understood by those skilled in the art, the erasure of the secure pairing key is the same as overwriting the key with zeroes. If a wireless connection pairing with a user device is to be terminated or dropped by the access device 104, then the access device 104 erases or overwrites any valid wireless link key associated with that user device. Optionally, when a secure pairing with a user device is dropped, if the security information also comprises a connection password, which may be common to all securely paired devices, the connection password may also be erased or overwritten.

A transaction, or security token session, comprises a set of instructions or data transmitted from a connecting user device 10, 20, 30, or 100 to the access device 104, or vice versa. In the preferred embodiment, only a single session may be open at a given time, and a session may be used by only a single connection. The session is typically substantially shorter than the lifetime of the secure or wireless connection pairing.

Preferably, when the connecting user device 10, 20, 30, or 100 is configured to request security functions from a security token 108, the user device 10, 20, 30, or 100 is configured to construct a command which may comprise a number of data for transmission over the wireless link 16, 26, 36, or 106, to the access device 104. The user device 10, 20, 30, or 100 may first construct and transmit a request for a security token session; the request may comprise the access device ID or the MAC address of the access device 104; a device identifier, which may comprise a MAC address for the connecting user device 10, 20, 30, or 100, or a device name previously provided to the access device 104 during the pairing process; and an instruction requesting a session. If the request is acknowledged by the access device 104, the user device 10, 20, 30, or 100 may then construct and transmit one or more commands. Preferably, the command comprises the access device ID or the MAC address of the access device 104; the payload, which may comprise an instruction to be carried out by the access device 104, or other data; and the device identifier of the connecting user device 10, 20, 30, or 100. Upon receipt of the command over the wireless link 16, 26, 36, or 106, the access device 104 is therefore able to determine which device sent the command, and can format any acknowledgement or response with the MAC address or device name of the transmitting connecting user device 10, 20, 30, or 100. Each command is preferably secured or signed using a key derived from the master connection key, which is preferably unique to each connecting user device 10, 20, 30, or 100; the access device 104 will decrypt or authenticate the command using the appropriate key derived from the master connection key stored in the access device 104. The access device 104 may likewise encrypt or sign the commands or responses transmitted to the connecting user device 10, 20, 30, or 100 using keys derived from the master connection key, and the connecting user device 10, 20, 30, or 100 in turn may decrypt or authenticate the received messages using its stored master connection key and the keys derived therefrom.

During a single security token session, a connecting user device 10, 20, 30, or 100 may transmit a number of commands to the access device 104, and the access device 104 may in turn transmit a number of responses or acknowledgements to the connecting user device 10, 20, 30, or 100. While it is unlikely that a second connecting user device 10, 20, 30, or 100 would need to transmit commands to the access device 104 at the same time as a first device if the access device and the paired user devices 10, 20, 30, or 100 are operated by a single user, the access device 104 may be configured to handle simultaneous received commands. In the preferred embodiment, if the access device 104 is engaged in a first security token session with a first user device 10, 20, 30, or 100 when another request for a second security token session is received by the access device 104, the access device 104 caches the request in its memory 328; when the first security token session is terminated, the access device 104 retrieves the cached request and transmits an acknowledgement to the second device user device 10, 20, 30, or 100, thus opening the security token session with the second device. The second user device 10, 20, 30, or 100 then proceeds by transmitting a command to the access device 104. In an alternative embodiment, the access device 104 ignores other requests for security token sessions until the first security token session is terminated. In either of these embodiments, the second user device 10, 20, 30, or 100, while its request for a session is not immediately handled, continues to receive and transmit the heartbeat described above and may be configured to maintain its wireless and secure pairing so long as the heartbeat is received.

In a further embodiment, a further request for a security token session is acknowledged by the access device 104 during an existing security token session, and the access device 104 interleaves the commands received, processed, and the responses transmitted from and to the separate connecting user device 10, 20, 30, or 100. Alternatively, if the request for a security token session includes an identifier of the nature of the transaction required, the access device 104 may prioritize the requested security token sessions in accordance with a predetermined order of precedence. For example, requests for smart card functionality for a user to log into a user device 10, 20, 30, or 100 may be granted higher priority than a request for a user to digitally sign an outbound electronic mail message.

In some circumstances, the connection between one or more user devices 10, 20, 30, or 100 securely paired with the access device 104, and the access device 104, may become "stale". The user device 10, 20, 30, or 100 may be deemed "stale" upon the determination of the occurrence of one or more events that are associated with an increased risk that another user or an attacker may obtain the user device 10, 20, 30, or 100 and use it to gain access to the security token 108 in communication with the access device 104. Examples of events that are associated with this increased risk include, but are not limited to, the events of the loss of the user device; the theft of the user device; the determination that the device has not been used for a predetermined length of time; the replacement of the device; or the redeployment of the device. Each of these events presents the risk that the user device 10, 20, 30, or 100 may remain authorized to the access device 104 in communication with the security token 108 because of the secure pairing between the user device 10, 20, 30, or 100, although the user device is no longer in the possession or control of the user who was authorized to use the user device 10, 20, 30, or 100 thus securely paired. The authorized user is may be the party in possession of the security token 108 or of the access device 104, particularly in the embodiment where the access device 104 is a mobile, wireless device. If a second, unauthorized user obtains the stale user device, this unauthorized user may gain access to the security token 108 by virtue of the secure pairing between the stale user device and the access device 104. The second unauthorized user may be a benevolent user (for example, if the stale user device had been redeployed to another user in the same organization as the first, authorized user), and not necessarily a rogue user.

In the preferred embodiment, the access device 104 is configured to detect whether a user device 10, 20, 30, 100 that has been securely paired with the access device 104 has become stale. For example, if a stale device is defined as a user device 10, 20, 30, or 100 that has not requested a session or transmitted a command to the access device 104 for a predetermined period of time or stale period, the access device may assign a "stale" status to that device in the connection information 205. In FIG. 3A, the connection information 205 provides the field LAST CONNECTION 207 and STALE_FLAG 208. The field LAST CONNECTION may comprise data relating to the last date and/or time that the user device 10, 20, 30, or 100 requested a session or issued a command to the access device 104. In FIG. 3A, the LAST CONNECTION field 207 indicates such a date and time in universal time format (UTC). This field 207 is preferably maintained in the memory 328 of the access device 104, and is updated by the access device 104 each time the user device 10, 20, 30, or 100 requests a session or issues a command to the access device 104. The STALE_FLAG 208 field preferably comprises a value that indicates whether the access device 104 has assigned the user device 10, 20, 30, or 100 a stale status. In FIG. 3A, a value of 0 indicates that the device is not stale; a value of 1 indicates that the device is stale. In another embodiment, the STALE_FLAG 208 field may be a field to indicate whether the device is not stale. As can be seen in FIG. 3B, there is a field ACTIVE_FLAG 209, and in this field a value of 1 indicates that the device is not stale (in other words, active), and a value of 0 indicates that the device is stale.

Preferably, upon the completion of the secure pairing process, a first value is generated by the access device 104 and stored in the LAST CONNECTION 207 field. This first value may be the date and time of the completion of the secure pairing. In this embodiment, the access device 104 also generates and stores an appropriate value in the STALE_FLAG 208 or ACTIVE_FLAG 209 field, as the case may be. The access device 104 may be configured to presume that immediately upon completion of the secure pairing process, the user device 10, 20, 30, or 100 is not stale. Thereafter, the access device 104 intermittently or periodically checks the values stored in the LAST CONNECTION field 207 for each user device 10, 20, 30, or 100 that is securely paired with the access device 104. The access device 104 may check these values each time a user device 10, 20, 30, or 100 requests a session with the access device 104, or at a predetermined time every day, or with a predetermined frequency (for example, every hour or every 48 hours, or every 14 days) to determine whether the difference in time between the time stored in the LAST CONNECTION 207 field and the current time exceeds a preset value. The preset value may be determined by information technology (IT) policies, and may be changeable by the user, administrator, or a superuser of the access device 104. If the preset value is exceeded, then the access device 104 determines that the corresponding user device 10, 20, 30, or 100 is stale, and alters the value recorded in the STALE_FLAG 208 or ACTIVE_FLAG 209 field accordingly.

Other possible events that may be associated with a stale device include software security issues. For example, if a version of a software application or the operating system software installed on a user device 10, 20, 30, or 100 was known to have a security problem and an upgrade or patch was made available for the software to repair the known problem, the access device 104 may be configured to detect whether the upgrade or patch was installed on the user device 10, 20, 30, or 100. If the access device 104 determines that the upgrade or patch had not been installed within a predetermined period of time from the upgrade or patch's release, this determination may be defined as a further stale event.

For the access device 104 to determine whether an upgrade or patch has been installed on the user device 10, 20, 30, or 100, preferably the software installed on the user device 10, 20, 30, or 100 is provided with an associated version number, which is readable by an external application. The associated version number may be stored in a central lookup table or other registry in the memory of the user device 10, 20, 30, or 100, such as in memory 308 or 278, or it may be stored in a designated memory location in the memory 308 or 278. For example, if the associated version number is stored in a known memory location, this known memory location may correspond with a portion of the code 309 or 289 stored in the memory. When a patch or upgrade is installed on the user device 10, 20, 30, or 100, the associated version number is altered to reflect the patch or upgrade. The access device 104 in this embodiment is also provided with information about a version number that is expected to be associated with the software installed on the user device 10, 20, 30, or 100. The access device 104 may be provided with this information upon the installation of new firmware, for example, or the information may be directly loaded into the memory 328 of the access device 104 through a wireless or wired (such as a USB) connection. The access device 104 preferably stores this information about the expected version number in the connection information 205 with reference to the corresponding user device 10, 20, 30, or 100. For example, the connection information 205 shown in FIG. 3A and 3B may comprise this information in the field labelled LAST CONNECTION 207. Version numbers may comprise a time and/or date, but may also comprise other alphanumeric characters. Again, the access device 104 may then intermittently or periodically check the values stored in the LAST CONNECTION field 207 for each user device 10, 20, 30, or 100 that is securely paired with the access device 104. The access device 104 may query the user device 10, 20, 30, or 100 for the associated version number, or the user device 10, 20, 30, or 100 may be configured to include the associated version number in any request for a transaction or session. However the access device 104 receives the associated version number, the access device 104 compares this value to the stored value in the field 207. If the values do not match, then the access device 104 determines that the corresponding user device 10, 20, 30, or 100 is stale, and alters the value recorded in the STALE_FLAG 208 or ACTIVE_FLAG 209 field accordingly.

Upon determining that a user device 10,20,30, or 100 has become stale, the access device 104 automatically initiates a management protocol for handling the now-stale device. The protocol may comprise alternative methods for handling the device that is determined to be stale. For example, the access device 104 may be configured to treat the STALE_FLAG 208 or ACTIVE_FLAG 209 value as a signal such that if the stale user device 10, 20, 30, or 100 requests a further session, the access device 104 automatically requests the connection password from the stale device. If the access device 104 receives the connection password from the stale device, it may then alter the value in the STALE_FLAG 208 or ACTIVE_FLAG 209 to reflect that the device is no longer to be treated as stale.

As another example, the access device 104 may be configured to transmit a notification out to all other user devices 10, 20, 30, and 100 securely paired with the access device 104 (and optionally the stale device as well) that a stale device has been detected. The other user devices 10, 20, 30, or 100 may then display an alert to the user. This may alert the authorized user of the stale device, or the user of the remaining, active devices 10, 20, 30, or 100, to locate and/or assess the status of the stale device. The user may then manually, rather than automatically, erase the secure pairing between the stale device and the access device 104 by issuing a command to the access device 104 to terminate that pairing.

In another embodiment, upon determining that a user device is stale, the access device 104 may automatically "drop" or terminate the secure pairing. The access device 104 may, in a further embodiment, also terminate the wireless connection pairing. The access device 104 may optionally transmit a notification that the device has been removed from the access device 104's records, in a manner similar to that described above. In this embodiment, the access device 104 does not need to check the value of a STALE_FLAG 208 or ACTIVE_FLAG 209 field, as shown in FIG. 3C; instead, the access device 104 need only refer to the value in the LAST CONNECTION 207 field to determine that the user device 10, 20, 30, or 100 has become stale. As can be seen in FIG. 3C, the access device 104 has dropped the connection with the user device 20; the secure pairing key and the wireless link key values have been overwritten with zero.

By configuring the access device 104 to automatically determine whether a device is stale, the user of the user device 10, 20, 30, or 100 is not required to monitor each and every device 10, 20, 30, and 100 paired with the access device 104, and furthermore the user is not required to take any positive action to identify a stale device to the access device 104. Rather, the access device 104 automatically identifies a user device 10, 20, 30, or 100 as a stale device, and attempts to notify the user in the preferred embodiment by pushing a notification to the remaining devices 10, 20, 30, or 100. The user may then choose to respond by confirming the status of the device as a stale device, or alternatively by selecting an action for the next time the stale device attempts to connect with the access device 104.

It will be appreciated that the system described herein may also operate in an environment in which the access device 104 communicates with a plurality of user devices 10, 20, 30, 100 as contemplated above, but using different protocols; for example, the access device may communicate over a wireless link with a first user device (for example user device 100), but over a fixed (wired) link with another user device (such as user device 10).

Those skilled in the art will appreciate that other embodiments of the system described herein may include zero or more mobile devices 100, and zero or more other computing devices 10, 20, or 30. In a preferred embodiment, the access device 104 may be configured to allow a simultaneous connection to only one mobile device 100, but a plurality of other computing devices 10 or 20.

As another example, the systems and methods disclosed herein may be used with many different computers and devices, such as a further wireless mobile communications device 100 shown in FIG. 4. With reference to FIG. 4, the mobile device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 4 by the communication tower 419. These voice and data networks may be separate communication networks using separate infrastructure, such as base stations, network controllers, etc., or they may be integrated into a single wireless network.

The transceiver 411 is used to communicate with the network 319, and includes the receiver 412, the transmitter 414, the one or more local oscillators 313 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 311 via a link between the DSP 420 and the microprocessor 438.

The detailed design of the transceiver 411, such as frequency band, component selection, power level, etc., will be dependent upon the communication network 419 in which the mobile device 100 is intended to operate. For example, a mobile device 100 intended to operate in a North American market may include a transceiver 411 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 419, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

The non-volatile memory 424 preferably provides a file system to facilitate storage of PIM data items on the device. The PIM application preferably includes the ability to send and receive data items, either by itself, or in conjunction with the voice and data communication modules 424A, 424B, via the wireless networks 419. The PIM data items are preferably seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 430 of the mobile device 100 to the serial port of a computer system or device. The serial port 430 may also be used to enable a user to set preferences through an external device or software application, or to download other application modules 324N for installation. This wired download path may be used to load an encryption key onto the device, which is a more secure method than exchanging encryption information via the wireless network 419.

A short-range communications subsystem 440 is also included in the mobile device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

I claim:

1. A method for managing a connection by a security token access device, the security token access device being adapted to wirelessly communicate with a plurality of user devices and to be securely paired with at least two user devices, the method being implemented on the security token access device and comprising:

maintaining, in memory in the security token access device, a store of connection information comprising security information for each of the at least two securely paired user devices and a value for each of the at least two securely paired user devices representing a last time said securely paired user device communicated with the security token access device;

determining whether one of the at least two securely paired user devices is a stale device that has not communicated with the security token access device for a predetermined period of time by comparing the value representing the last time said securely paired user device communicated with the security token access device against a predetermined value;

storing an associated value representing the status of the one of the at least two securely paired user devices as a stale device or an active device;

upon receiving a communication from said one of the at least two securely paired user devices, checking the associated value for that user device to determine whether the user device is a stale device;

when it is determined that one of the at least two securely paired user devices is a stale device, altering the associated value for that user device to represent its status as a stale device and implementing a management protocol for handling the stale device, wherein the management protocol comprises at least one of:

requiring the stale device to provide a connection password to the security token access device upon the event of a further communication from the stale device to the security token access device to access a security token in communication with the security token access device;

clearing at least a portion of the security information for the stale device from the store of connection information; or transmitting a signal to any remaining securely paired user devices of the at least two securely paired user devices, the signal comprising a notification that said one of the at least two securely paired user devices has been determined to be a stale device.

2. The method of claim 1, wherein implementing the management protocol for handling the stale device comprises at least one of:

requiring the stale device to provide a connection password to the security token access device upon the event of a further communication from the stale device to the security token access device; or clearing at least a portion of the security information for the stale device from the store of connection information.

3. The method of claim 2, wherein implementing the management protocol for handling the stale device comprises requiring the stale device to provide a connection password to the security token access device upon the event of a further communication from the stale device to the security token access device.

4. The method of claim 1, wherein said comparing comprises comparing a difference between the value representing the last time said securely paired user device communicated with the security token access device and the current time against the predetermined value.

5. The method of claim 1, wherein a stale device comprises a device that comprises a software version number that does not match an expected software version number stored by the security token access device.

6. The method of claim 5, wherein the connection information for each of the at least two securely paired user devices comprises a value representing an expected software version number associated with said securely paired user device, and further wherein determining whether one of the at least two securely paired user devices is a stale device further comprises receiving a software version number from said securely paired user device, and comparing the software version number thus received against the expected software version number.

7. The method of claim 1, wherein at least one user device is a mobile communication device.

8. A computer program product comprising a non-transitory computer-readable medium comprising code executable by a computing device for carrying out the method of claim 1.

9. A smart card reader adapted to communicate with a plurality of user devices and to be securely paired with at least two user devices for implementing the method of claim 1.

10. The method of claim 1, wherein the stale device comprises a device that has been determined to have been lost, that has been determined to have been stolen, or that has been redeployed.

11. A security token access device adapted to wirelessly communicate with a plurality of user devices and to be securely paired with at least two user devices, the security token access device comprising:

a memory for storing connection information comprising security information for each of the at least two securely paired user devices and a value for each of the at least two securely paired user devices representing a last time said securely paired user device communicated with the security token access device;

an interface for communication with a security token;

a processor adapted to determine whether one of the at least two securely paired user devices is a stale device by comparing the value representing the last time said securely paired user device communicated with the security token access device against a predetermined value, and when it is determined that one of the at least two securely paired user devices is a stale device, to implement a management protocol for handling the stale device, wherein the management protocol comprises at least one of:

requiring the stale device to provide a connection password to the security token access device upon the event of a further communication from the stale device to the security token access device;

clearing at least a portion of the security information for the stale device from the stored connection information; or transmitting a signal to any remaining securely paired user devices of the at least two securely paired user devices, the signal comprising a notification that said one of the at least two securely paired user devices has been determined to be a stale device.

12. The security token access device of claim 11, wherein the security token access device is adapted to be securely paired with at least three user devices.

13. The security token access device of claim 12, wherein the security information comprises a secure pairing key for each of the user devices securely paired with the security token access device.

14. The security token access device of claim 13, wherein the connection information for each of the at least two securely paired user devices comprises a value representing an expected software version number associated with said securely paired user device, and the processor is further adapted to determine whether one of the at least two securely paired user devices is a stale device by receiving a software version number from said securely paired user device, and comparing the software version number thus received against the expected software version number.

15. The security token access device of claim 11, wherein said comparing comprises comparing a difference between the value representing said last time the securely paired user device communicated with the security token access device and the current time against the predetermined value.

16. A computing device comprising the security token access device of claim 11.

17. A mobile communication device comprising the security token access device of claim 11.

18. The security token access device of claim 11, wherein the stale device comprises a device that has been determined to have been lost, that has been determined to have been stolen, or that has been redeployed.

* * * * *